United States Patent

Stephens et al.

[11] Patent Number: 5,406,708
[45] Date of Patent: Apr. 18, 1995

[54] FLEXIBLE ROTATING VEGETATION CUTTER

[76] Inventors: Lyle G. Stephens, 1271 Wagstaff Rd., Paradise, Calif. 95969; LeRoy M. Stephens, 2812 School St., Oakland, Calif. 94602

[21] Appl. No.: 58,635

[22] Filed: May 6, 1993

[51] Int. Cl.⁶ .................................. A01D 34/63
[52] U.S. Cl. ................................ 30/276; 56/12.7
[58] Field of Search ............... 30/276, 347; 56/12.1, 56/12.7, 17.5, 255, 295

[56] References Cited

U.S. PATENT DOCUMENTS

| | | | |
|---|---|---|---|
| 4,295,324 | 10/1981 | Frantello et al. | 56/12.7 |
| 4,819,416 | 4/1989 | Jones | 56/12.7 |
| 4,962,630 | 10/1990 | Jones | 56/12.7 |
| 5,023,998 | 6/1991 | Masciarella et al. | 30/276 |
| 5,048,278 | 9/1991 | Jones et al. | 56/295 |

Primary Examiner—Richard K. Seidel
Assistant Examiner—Hwei-Siu Payer
Attorney, Agent, or Firm—Jim Hillman

[57] ABSTRACT

A rotatable retaining structure for flexible cutters for cutting vegetation and the like, having a hub, a plurality of arms extending radially outward from the hub and a guard disk disposed outwardly on the arms at a predetermined radial distance from the hub. The arms include slanted or cambered edges to create upward air currents to lift and pull the vegetation into the rotating flexible cutters. The guard disk may be weighted so as to simulate a flywheel for the motor shaft and has an additional air foil for disposing vegetation cuttings outwardly.

15 Claims, 2 Drawing Sheets

FLEXIBLE ROTATING VEGETATION CUTTER

FIELD OF THE INVENTION

This invention relates to apparatus for cutting grass and other vegetation and in particular to a flexible line retaining means that integrally incorporates both an obstacle guard and an air foil.

BACKGROUND OF THE INVENTION

For some time now filament string vegetation cutters have been used for grass trimmers, lawn mowers, and weed removers. Such string trimmers are attached to and extend from a balanced mower head or framework which is centrally mounted on a shaft which is rotated by means of an electric or gas motor. Typical examples are disclosed in U.S. Pat. Nos., 4,112,653: 5,023,998; 4,513,563; 4,962,630; 4,295,324; 4,461,138; 4,819,416; and 4,962,635.

U.S. Pat. No. 5,023,998 discloses a four quadrant string vegetation cutter where the quadrants are offset to create a protrusion that acts as a rock guard. U.S. Pat. Nos. 4,295,324, and 4,962,630 disclose air foils disposed on line holder arms to lift the grass or vegetation upward prior to its being cut. Since a rock guard requires a full diameter or over diameter projection dish, it would seem to be incompatible with air foil means to cause upward drafts. In addition the air toils of the prior art have been disposed on the leading edge of the support line holder arms where they are prone to damage by rocks or other projections of the terrain.

Accordingly, it would be desirable to have a string trimmer retaining means that incorporated both a rock guard and an air foil means to cause upward drafts. It would also be desirable if the string trimmer retaining means incorporated the air foil means on the trailing edge of its support arms so as to protect the air foil edge from damage from abrasive particles and abrupt edges encountered when traversed over rough terrain. It would also be desirable to have a second air foil means disposed on a rock guard annular disk to direct air and entrained vegetation outwardly. It would further be desirable if the rock guard had an annular shape and circumvented and attached to the outer ends of radial arms so as to provide a unibody integral construction of the retaining means framework for strength/unit weight. It would also be desirable if the annular shaped rock guard is made of a dense material or is adapted to carry dense material distributed over its circumference so as to simulate a flywheel means for use with the motor driven shaft of the vegetation cutting apparatus.

SUMMARY OF THE INVENTION

Briefly the present invention is a novel flexible rotatable vegetation cutter that has an integral open star shaped geometry including a hub that has a centrally positioned bore disposed therethrough for receiving a rotatable shaft, a plurality of star shaped arms extending radially outward from the hub and an annular guard disk attached to the star shaped arms at a predetermined radial distance outwardly from the hub. Preferred embodiments of the invention include an air foil camber or slanted edge disposed on the radial arms to provide vertical air currents which pull the vegetation upwards and into the rotating monofilament lines carried by the radial arms. A second airfoil may be disposed on the guard disk to direct air and entrained vegetation outwardly. The guard disk may be formed of dense material or weighted to simulate an integral flywheel for use with the vegetation cutter motor. This is especially important if the vegetation cutter is driven by an internal combustion engine. A unique means for retaining each flexible monofilament line securely within an end cap arrangement is disposed on and integral with each radial arm. The unique integral geometry of the frame of the vegetation cutter provides for making the frame from lighter unreinforced materials that would otherwise be mandated by the vigorous environment of the invention.

BRIEF DESCRIPTION OF THE DRAWINGS

The invention may be understood and further advantages and uses thereof more readily apparent, when considered in view of the following detailed description of the exemplary embodiments, taken with the accompanying drawings in which.

DESCRIPTION OF THE PREFERRED EMBODIMENTS

Figure 1:
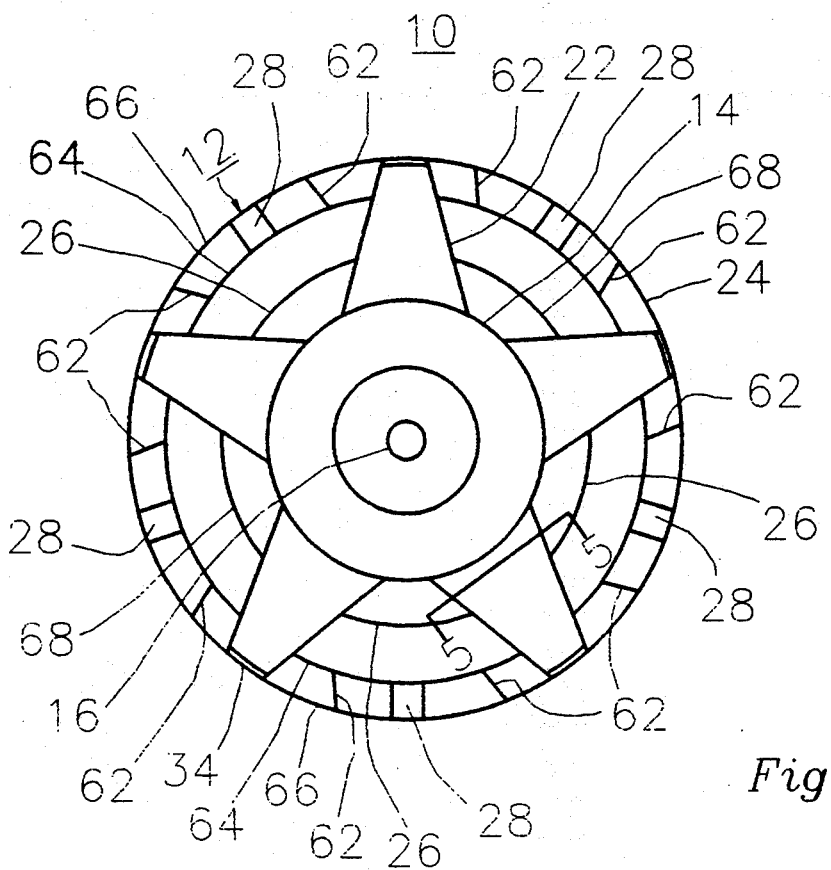
FIG. 1 is a top view of the flexible rotating vegetation cutter constructed according to the teachings of the invention.

Referring now to the drawings that are shown in FIGS. 1–4 respectively, top, bottom, front, and isometric views of the flexible cutter retaining means 10 constructed according to the teachings of the invention. Flexible cutter retaining means 10 generally comprises frame 12 including hub 14 for having a centrally positioned bore 16 disposed therethrough which bore 16 is sized to receive a rotatable shaft (not shown) such as commonly extends below a lawnmower deck or string trimmer body, which shaft is integral with or driven by a motor. Frame 12 further includes a plurality of radially extending arm means 22 which may be attached to or made integral with hub 14 and annular guard disk 24 disposed on arm means 22 at a predetermined radial distance from hub 14, again either by attachment or integral therewith, so as to provide open spaces on through holes 26. Open spaces 26 provide a path for air currents that are generated by Flexible Cutter Retaining means 10 as will be explained later. Annular guard disk 24 may be formed of a dense material or may be adapted for retaining dense materials such as shown drawn in phantom at 28 distributed evenly about it's circumference. The mass of guard disk 24 itself or the mass of evenly distributed dense materials 28 serve to simulate or act as a flywheel attached to the rotatable shaft of the engine driving the lawnmower or string trimmer.

Figure 3:
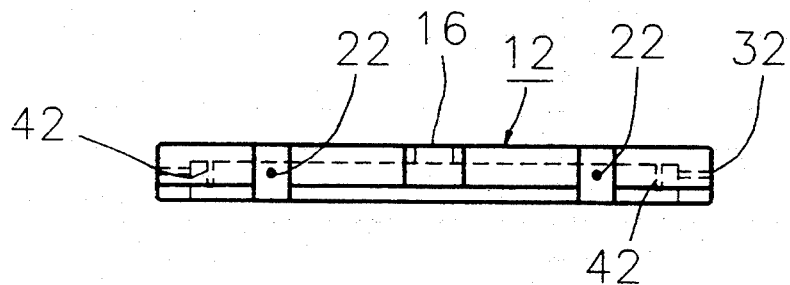
FIG. 3 is a side view of the flexible rotating vegetation cutter constructed according to the teachings of the invention.
Figure 7:
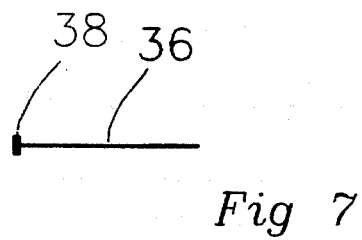
FIG. 7 is a plan view of a typical monofilament whip flexible line.

Suitable approximate dimensions for frame 12 are given with reference to FIG. 3, wherein "A" is 9 inches, "B" is 9.5 inches, "C" is ½ inch, "D" is ⅞ inch, "E" is 1/16 inch and "F" is ⅛ inch. Although these dimensions of the preferred embodiment have provided an excellent framework for the flexible rotating means of the invention, it is to be understood that other dimensions would work just as well. Of particular note is the diameter "G" of passageway 32 of end cap 34, which is sized to allow a corresponding flexible cutting means 36, such as for example, a monofilament line or a spring steel cutting wire to pass therethrough. Such a flexible monofilament cutting line 36 is shown at FIG. 7 and is typically manufactured with a predetermined diameter along its length and an encumbrance 38 such as a knot of crimped washer. The flexible retaining means frame 12 of the invention includes flange 42 disposed in multiple arm means 22 a predetermined distance "H" larger than passageway 32's diameter "G" but small enough to retain encumbrance 38 therein after flexible cutting line 36 is pulled into position.

Figure 5:
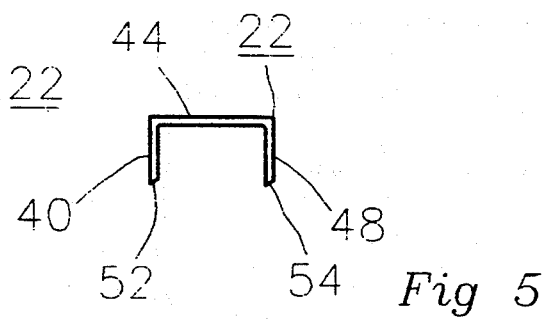
FIG. 5 is a cross sectional view taken along the lines 5—5 of FIG. 1, showing the air foil 5° edge slant of the vertical sides of one of the radial arms of FIG. 1.
Figure 6:
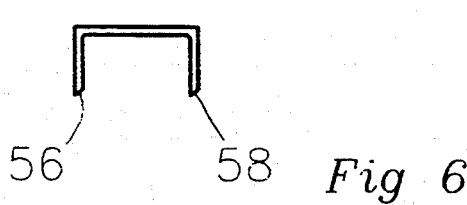
FIG. 6 is another embodiment of an enlarged cross section view of FIG. 5, where this time the vertical sides have a camber instead of a slanted edge disposed thereon.

Referring now to FIG. 5, there is shown a cross sectional view of a typical arm means 22 of the invention including horizontal surface 44 and leading and trailing vertical surfaces 46 and 48 respectively. Vertical surfaces 46 and 48 have slanted edges, 52 and 54 respectfully disposed at a 5° slant from the front slanting upward to the back so as to provide a first air foil means when frame 12 is rotated in a clockwise direction. Alternately a camber may be utilized for the first air foil means as shown in FIG. 6, wherein cambers 56 and 58 are disposed on the edge of vertical surfaces 46 and 48 respectfully. Cambers such as 56 and 58 present greater bulk and strength at the front edge of vertical surfaces 46 and 48 respectively so as to resist degradation from impact.

Referring now to FIG. 1, the annular guard disk 24 may be serrated with ridges or other projections, 62 disposed on the top side starting at the ID 64 and trailing opposite the direction of rotation to the OD 66 at a predetermined transverse angle such as for example 15°. This would provide a second air foil means to direct outwardly the upward draft of air and entrained vegetation cuttings provided by the first air foil means.

Figure 2:
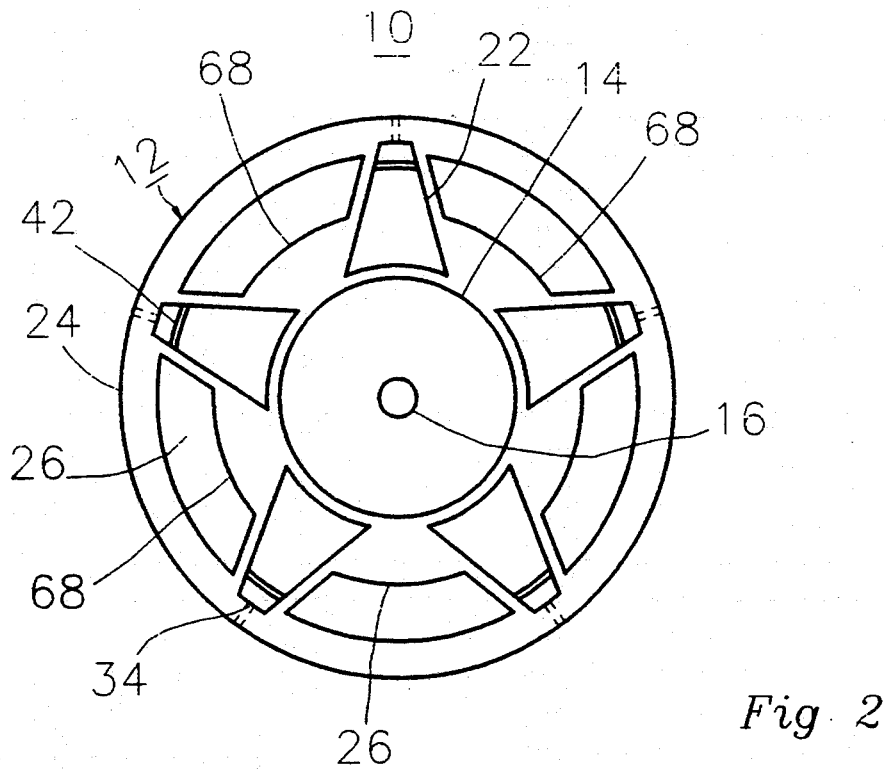
FIG. 2 is a bottom view of the flexible rotating vegetation cutter constructed according to the teachings of the invention.
Figure 4:
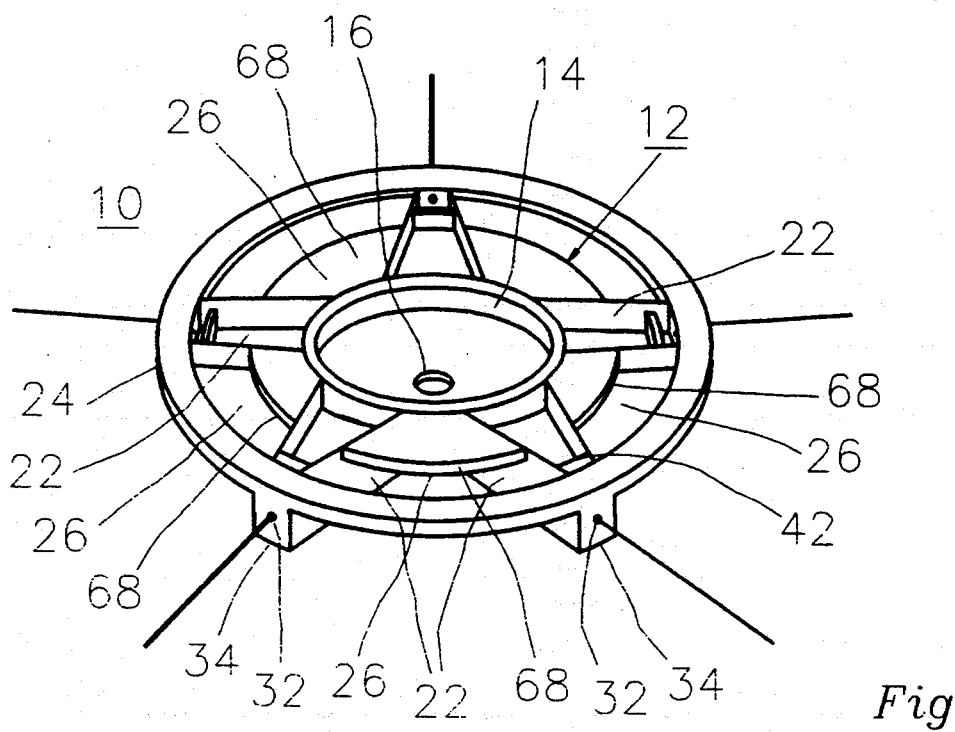
FIG. 4 is an isometric view of the flexible rotating vegetation cutter constructed according to the teachings of the invention.

Referring now to FIGS. 1, 2, and 4, for increased rigidity ring segments 68 may be disposed integrally with hub 14 and between adjacent and means 22. Because of the strength of the integral framework design, such ring segments will only be necessary for extremely adverse conditions.

In conclusion, there has been disclosed a string trimmer retaining means that incorporates in a unique integral high strength/weight ratio frame, both a rock guard deflection means and an airfoil means to direct vegetation into affixed string cutters. The air foil means is located on the trailing edge of radial support arms for protection from abrasion. The rock guard means has an annular shape and circumvents and attaches to the star shaped support arms so as to provide an integral unibody framework and act as a flywheel for the rotating shaft of the vegetation cutting apparatus.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. A rotatable flexible cutter for cutting vegetation when rotated in a first direction of rotation, comprising:
   a. a rotatable frame including a hub, a plurality of arm means extending radially outwardly from said hub and an annular guard disk attached to said arm means at a predetermined radial distance outwardly from said hub;
   b. a centrally positioned bore disposed through said hub for receiving a rotatable shaft;
   c. a plurality of flexible cutting means; and
   d. a plurality of securing means for securing each of said flexible cutting means to each of said arm means;
   wherein each of said arm means includes a horizontal surface and two vertical surfaces, a leading vertical surface and a trailing vertical surface in the direction of rotation, said vertical surfaces being connected to said horizontal surface along their top edge with their bottom edges extending downwardly, and wherein the bottom edge of said trailing vertical surface includes a first air foil means for generating vertical air currents upwardly during rotation of the frame to provide a low pressure zone above the bottom edge.

2. The flexible cutter of claim 1 wherein the bottom edge of said leading vertical surface also includes a first air foil means for generating vertical air currents upwardly during rotation of the frame to provide a low pressure zone above the bottom edge.

3. The flexible cutter of claim 2 wherein the first air foil means have a predetermined camber.

4. The flexible cutter of claim 2 wherein the first air foil means each includes a slanted bottom edge from a front side of its respective leading and trailing vertical surface, slanting at a predetermined angle upwardly and to a rear side of its respective leading and trailing vertical surface, opposite the direction of rotation.

5. The flexible cutter of claim 4, wherein the predetermined angle is 5°.

6. The flexible cutter of claim 2 wherein each of said plurality of arm means includes a hub end and an outer extension end having an end cap and wherein each of the securing means include a passageway disposed through said end cap having a diameter sized to permit a corresponding flexible cutting means to pass therethrough.

7. The flexible cutter of claim 6 wherein each said securing means includes a flange disposed within each respective arm means a sufficient distance larger than said passageway diameter from said end cap to permit said corresponding flexible cutting means to pass between said flange and said end cap through said passageway, but wherein said sufficient distance is sized small enough to prevent said corresponding cutting means to withdraw.

8. A rotatable flexible cutter for cutting vegetation when rotated in a first direction of rotation comprising:
   a. a rotatable frame including a hub having a predetermined outer radial diameter, a plurality of arm means extending radially outwardly from said hub and an annular guard ring having a predetermined uniform outer radial diameter greater than the outer radial diameter of the hub attached to said arm means at a predetermined radial distance outwardly from said hub, to provide through holes between the hub, the annular guard ring and the plurality of arm means;

b. a centrally positioned bore disposed through said hub for receiving a rotatable shaft;

c. a plurality of flexible cutting means; and d. a plurality of securing means for securing each of said flexible cutting means to each of said arm means.

9. The flexible cutter of claim 8 wherein each of said plurality of arm means includes a hub end and an outer extension end and wherein each of said plurality of arm means includes an end cap disposed at the outer extension end of the arm means and wherein each of the securing means includes a passageway disposed through said end cap having a diameter sized to permit a corresponding flexible cutting means to pass therethrough.

10. The flexible cutter of claim 9 wherein each said securing means includes a flange disposed within each respective arm means a sufficient distance larger than said passageway diameter from said end cap to permit said corresponding flexible cutting means to pass between said flange and said end cap radially outwardly through said passageway, but wherein said sufficient distance is sized small enough to prevent said corresponding flexible cutting means to withdraw radially inwardly through said passageway.

11. The flexible cutter of claim 10 wherein the guard ring is disposed at the outer extension ends of the plurality of arm means.

12. The flexible cutter of claim 11 wherein the guard ring extends beyond the outer extension ends of the plurality of arm means.

13. The flexible cutter of claim 8 wherein the plurality of arm means each includes a first air foil means for creating upward air currents that are directed through the through holes between the hub, the guard ring and the plurality of arm means.

14. The flexible cutter of claim 13 wherein the guard ring includes a second air foil means for directing the upward air currents, created by the first air foil means, radially outward.

15. A rotatable retaining means for flexible cutters for cutting vegetation, comprising:

a. a rotatable frame including a plurality of arm means extending radially outwardly and an annular guard ring attached to said arm means at a predetermined outward radial distance;

b. a first air foil means disposed on at least one of said arm means for creating an upward air current; and c. a second air foil means disposed on said guard ring for directing said upward air current radially outwardly.

* * * * *